US012597242B2

(12) United States Patent
Kleder

(10) Patent No.: US 12,597,242 B2
(45) Date of Patent: Apr. 7, 2026

(54) DETERMINING EMITTER IDENTIFICATION INFORMATION TO A DESIRED ACCURACY

(71) Applicant: Michael Charles Kleder, Ashburn, VA (US)

(72) Inventor: Michael Charles Kleder, Ashburn, VA (US)

( * ) Notice: Subject to any disclaimer, the term of this patent is extended or adjusted under 35 U.S.C. 154(b) by 329 days.

(21) Appl. No.: 18/511,575

(22) Filed: Nov. 16, 2023

(65) Prior Publication Data

US 2024/0161476 A1 May 16, 2024

Related U.S. Application Data

(60) Provisional application No. 63/383,931, filed on Nov. 16, 2022.

(51) Int. Cl.
*G06V 10/776* (2022.01)
*G06V 10/764* (2022.01)
*G06V 10/82* (2022.01)

(52) U.S. Cl.
CPC .......... *G06V 10/776* (2022.01); *G06V 10/764* (2022.01); *G06V 10/82* (2022.01)

(58) Field of Classification Search
CPC .... G06V 10/776; G06V 10/764; G06V 10/82; G06F 18/24143
See application file for complete search history.

(56) References Cited

U.S. PATENT DOCUMENTS

| 8,326,240 B1 * | 12/2012 | Kadambe | .............. G01S 5/0215 |
| | | | 455/500 |
| 2003/0223512 A1 | 12/2003 | Ahmed et al. | |
| 2020/0018815 A1 | 1/2020 | O'Shea et al. | |

(Continued)

FOREIGN PATENT DOCUMENTS

| CN | 112464713 A | 3/2021 |
| WO | 2012051668 A1 | 4/2012 |

OTHER PUBLICATIONS

Wan, Tao, et al. "Deep learning-based specific emitter identification using integral bispectrum and the slice of ambiguity function." Signal, Image and Video Processing 16.7 (2022): 2009-2017. (Year: 2022).*

(Continued)

*Primary Examiner* — Utpal D Shah
(74) *Attorney, Agent, or Firm* — Snyder, Clark, Lesch & Chung, LLP

(57) ABSTRACT

A method and system are disclosed for identifying an emitter or transmitter (e.g., among a plurality of emitters) to a desired degree of accuracy. The method or system may receive a signal in a receiver from a transmitter, wherein the signal propagates from the transmitter to the receiver. The method or system may demodulate the received signal to generate a demodulated signal having a carrier frequency of zero and determine a bispectrum associated with the demodulated signal. The method or system may classify the bispectrum into a classification using a neural network having been trained to a signal emitted by the transmitter. The method or system may determine an accuracy of the classification based on a probability of the classification being greater than a threshold.

5 Claims, 7 Drawing Sheets

(56) References Cited

U.S. PATENT DOCUMENTS

2022/0217035 A1     7/2022  Melodia et al.

OTHER PUBLICATIONS

Parmaksz, Hüseyin, and Cihan Karakuzu. "A review of recent developments on secure authentication using RF fingerprints techniques." Sakarya University Journal of Computer and Information Sciences 5.3 (2022): 278-303. (Year: 2022).*

International Search Report and Written Opinion issued in corresponding International Application No. PCT/US2023/080085 mailed Mar. 1, 2024, 9 pages.

Banerjee et al. "A carrier peak synchronous direct digital demodulation technique and its FPGA implementation." Microprocessors and Microsystems 281. (2004), accessed Mar. 6, 2025, <https://www.sciencedirect.com/science/article/abs/pii/S0141933103001261>.

* cited by examiner

106/108

112/102

106/108

118/108

108

108

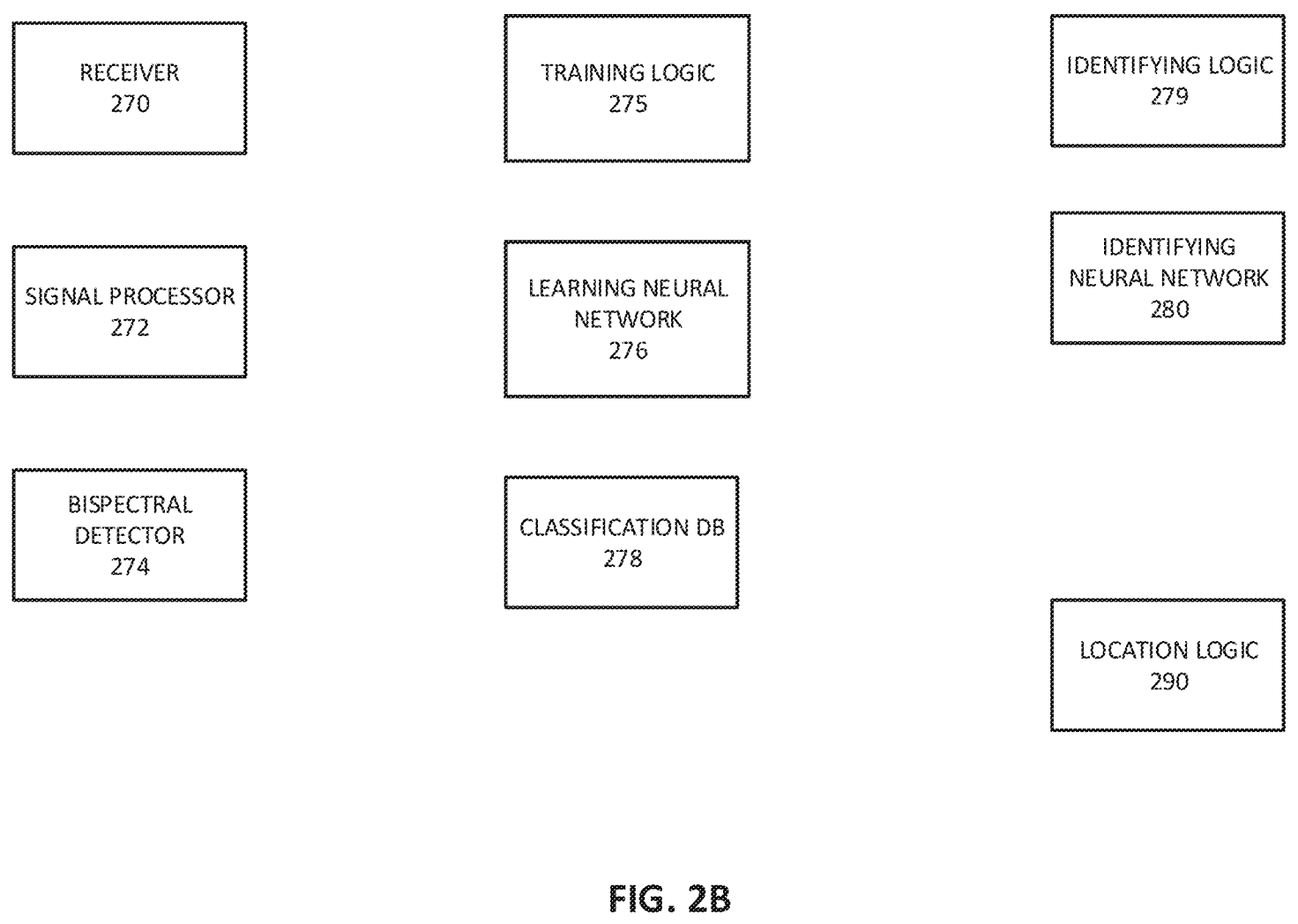

IDENTIFYING LOGIC
279

IDENTIFYING
NEURAL NETWORK
280

LOCATION LOGIC
290

TRAINING LOGIC
275

LEARNING NEURAL
NETWORK
276

CLASSIFICATION DB
278

RECEIVER
270

SIGNAL PROCESSOR
272

BISPECTRAL
DETECTOR
274

FIG. 2B

DETERMINING EMITTER IDENTIFICATION INFORMATION TO A DESIRED ACCURACY

RELATED APPLICATIONS

This patent application is based on and claims priority to U.S. Provisional Patent Application No. 63/383,931, filed Nov. 16, 2022, which is incorporated by reference herein.

BACKGROUND

Each modulated radio frequency (RF) signal has an "RF fingerprint" that depends on the characteristics, including imperfections, of the components of the emitter. Specific emitter identification (SEI) is the process of determining the RF fingerprint to associate a modulated signal to its specific emitter. SEI has many uses, including in spectrum management applications.

SUMMARY

A method and system are disclosed for identifying an emitter or transmitter (e.g., among a plurality of emitters) to a desired degree of accuracy. The method or system may receive a signal in a receiver from a transmitter, wherein the signal propagates from the transmitter to the receiver. The method or system may demodulate the received signal to generate a demodulated signal having a carrier frequency of zero and determine a bispectrum associated with the demodulated signal. The method or system may classify the bispectrum into a classification using a neural network having been trained to a signal emitted by the transmitter. The method or system may determine an accuracy of the classification based on a probability of the classification being greater than a threshold.

The method or system may repeat the steps of determining the bispectrum, classifying the bispectrum, and determining the accuracy of the classification of the bispectrum until the probability of the classification is greater than the threshold.

The transmitter may be a first transmitter and the system may include a plurality of other transmitters. The method or system may include training the neural network based on signals emitted by the first transmitter and a plurality of other transmitters.

In one embodiment, the neural network is a convolutional neural network for computer vision. In one embodiment, the probability of the classification is based on a Dirichlet or Beta distribution.

DESCRIPTION OF THE DRAWINGS

FIG. 2B is a block diagram of exemplary functional components of the receiver and/or the server of FIG. 1 in one embodiment;

DETAILED DESCRIPTION

Figure 1:
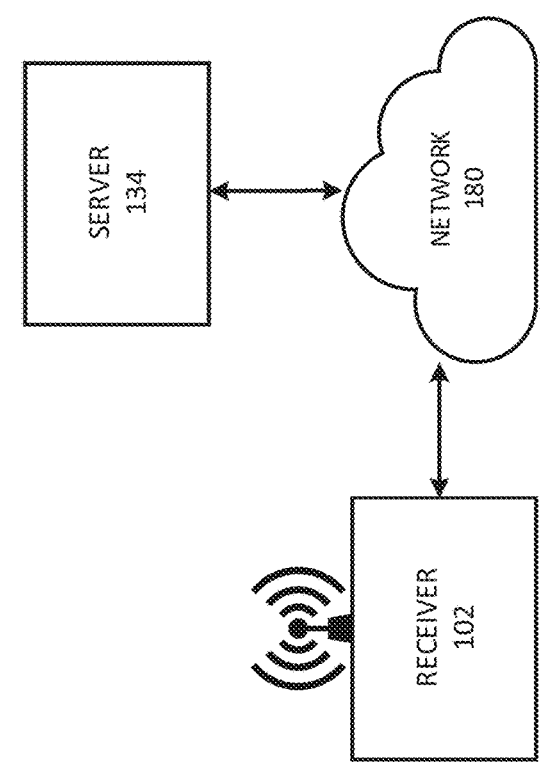
FIG. 1 is a diagram of an environment in which methods and systems described herein may be implemented.
Figure 1:
Figure 1:
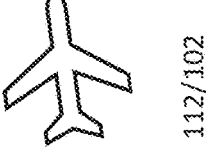
Figure 1:
Figure 1:
Figure 1:

The following detailed description refers to the accompanying drawings. The same reference numbers in different drawings may identify the same or similar elements. Also, the following detailed description does not limit the invention.

When manufactured, electronic components include imperfections. These imperfections, as long as they are within a tolerance, may not cause the component to fail. The imperfections, however, may introduce artifacts (e.g., typically nonlinear) when these components affect a signal (e.g., modulate, amplify, etc.) that is to be emitted. These artifacts may be called "warblings" or "undulations" and may be observed as a pattern of correlations in the appearance of pairs of frequencies within the width of the band in which a transmitter operates. Such a pattern is called a bispectrum. The artifacts are characteristic of the physical makeup of an emitter, so it is generally consistent throughout a modulated signal regardless of the information signal (e.g., regardless of the data encoded in the information or modulating signal). Because these artifacts or warblings may result from imperfections in the manufacturing process, in some instances these warblings are unintentional, although the methods described herein are not limited to unintentional effects.

Specific emitter identification (SEI), "fingerprinting," or "RE fingerprinting" is the process of labeling a radio as the source of a received signal by recognizing undulations in an emitted signal that are caused by component imperfections (e.g., nonlinear artifacts). In some instances, the radio may be uniquely identified by its fingerprints because the radio is identified by its unique components. This fingerprint arises from manufacturing deviations in the radio electronics, and allows one to distinguish one emitter from other emitters even if the other emitters are the same design and model. SEI may allow the identification of particular emitter devices even when they change locations in between observations, and thus to correlate emitter-specific information, such as digital signatures, encryption types, or hosting platforms, to observed signals. Undulations may also be caused deliberately, in that a manufacturer may provide a RF fingerprint with each device or, if manufacturing tolerances allow, deliberate deviations may be introduced into a device to generate a fingerprint.

Radio frequency signals may occupy a bandwidth between some lower frequency and some higher frequency when generated. Information is encoded into a signal by modulating one or more carrier frequencies (e.g., with an information signal) within that bandwidth using one of many available modulation schemes. One method of recovering the information signal is to select a center frequency within the bandwidth and extract the information signal (e.g., used to modulate the carrier signal) relative to that center frequency. After which, the low-frequency information signal may be operated on without the high-frequency carrier signal. The resulting demodulated signal has a new center frequency of zero, and thus distinct positive and negative frequency components. Because the Fourier transform of a real-valued signal has symmetric positive and negative frequency components, a signal that has different positive and negative frequency components must be a complex-valued signal, and therefore can be expressed using real and imaginary component signals. The conventional way of expressing these two components describes the real and imaginary components as "in-phase" and "quadrature" signals, or I/Q data. With a center frequency of $f_0$, the in-phase and quadrature components of a signal x(t) are obtained by:

$$I(t)=x(t)\cos\cos 2\pi f_0 t + H[x(t)]\sin\sin 2\pi f_0 t$$

$$Q(t)=H[x(t)]\cos\cos 2\pi f_0 t - x(t)\sin\sin 2\pi f_0 t$$

where the Hilbert transform H[x(t)] of x(t) is defined as:

$$H[x(t)] = \frac{1}{\pi}\int_{-\infty}^{\infty}\frac{x(\tau)}{t-\tau}d\tau = F^{-1}[(-i\cdot\text{sign}(f))\cdot F[x](f)]$$

where F is the Fourier transform, and the integral is taken in Cauchy's principal value sense, meaning that the singularity where $t=\tau$ is ignored.

SEI analysis on I/Q data may be independent of the frequency band of the signal, using instead only its modulation information (e.g., undulation information). This implies that an emitter cannot hide its identity by switching frequency bands, or alternatively that emitter modes can be distinguished by using the ability, conferred by the separation of I/Q and $f_0$ (the original carrier frequency), to consider the modulation and the frequency band as independent characteristics.

The signed amplitude of the bispectrum of a discretely sampled complex signal x(t) at angular frequencies $\omega_1$ and $\omega_2$ is defined as the Fourier transform of the third-order cumulant of x(t) as:

$$B(\omega_1, \omega_2) = \sum_{\tau_1}\sum_{\tau_2}e^{-j(\omega_1\tau_1+\omega_2\tau_2)}E_t[x^*(t)x(t+\tau_1)x(t+\tau_2)]$$

Because the cumulant is third-order about the mean (detecting skew), the bispectrum inherently ignores Gaussian background noise (the distribution of which has no skew) and de-emphasizes modulation of information to the extent that the distribution of encoded symbols is uniform or otherwise symmetric (e.g., a sequence of informative symbols are expected to have a nearly uniform distribution). If the signal-generating system were entirely linear—that is, the signal is generated pursuant to a linear differential equation—then the solution signal, neglecting the possibility of nonphysical exponential growth and decay terms, would consist entirely of sinusoidal components, and the distribution of signed signal amplitudes would be a symmetric distribution of positive and negative values. This leaves the bispectrum with the skewed distribution of non-linear attributes of the signal generating system, and hence emphasizes the modulation arising from imperfections in the manufactured components that are characteristic of a specific emitter.

One or more embodiments described below evaluate emitted signals and identify the emitted signals as belonging to a classification. Embodiments allow for the evaluation of samples and subsamples from emitted signals until a desired or prescribed (e.g., arbitrary) level of classification accuracy is attained. In one embodiment, a logarithmic reduction in error rate may be obtained with a linear increase in sample count. Embodiments may employ a multi-channel deep learning convolutional neural network acting on the bispectra of I/Q signal subsamples. High levels of accuracy may be obtained with minimal or reduced computation time.

FIG. 1A depicts an exemplary environment 100 for implementing algorithms disclosed herein. Environment 100 includes one or more receivers 102 (referred to individually as receiver 102), satellites 106 (individually referred to as satellite 106), one or more transmitters 108 (individually referred to as transmitter 108), an aircraft 112, a server 134, a radar installation 118, and/or a network 180. Transmitter 108 may also be referred to as emitter 108.

Methods and systems described herein may learn the RF fingerprints of emitters (e.g., of emitter 108) in environment 100 by sampling signals from the emitters. the methods and systems may then identify the emitters when encountering the emitters, e.g., at a later time.

Transmitter 108 may include an emitter having components that when manufactured include imperfections. Transmitter 108 may include any type of transmitter that transmits or emits a signal that is received by receiver 102. Transmitter 108 may transmit or emit human-made signals. Transmitters 108 may include radar installations 118, satellites 106, hand-held radios, mobile telephones, terrestrial broadcast antennas, and/or terrestrial mobile telephone towers. Transmitter 108 may have a fixed location. Alternatively, transmitter 108 may be moving (e.g., relative to the surface of the earth). If a television broadcast antenna, for example, transmitter 108 may transmit television signals using the Advanced Television System Committee (ATSC) standard. In one embodiment, the location of transmitter 108 is known (to some degree) with respect to time. For example, transmitter 108 may be fixed with time relative to the surface of the earth (such as a TV broadcast tower). Alternatively, transmitter 108 may move with time relative to the surface of the earth (such as with satellite 106). In one implementation, transmitter 108 may transmit sound waves alternatively or in addition to electromagnetic waves. As such, transmitter 108 may additionally or alternatively be coupled to a speaker as well as an antenna.

Receiver 102 may receive signals from transmitter 108 and record the signal to memory (e.g., sample and quantize) for signal processing. In one implementation, receiver 102 may, in addition to or as an alternative to receiving electromagnetic signals, receive sound waves. As such, receiver 102 may include a microphone in addition to or alternative to an antenna. Aircraft 112 may include receiver 102, for example.

Satellites 106 may be placed in varying orbits and may themselves include transmitter 108 from which receivers 102 may receive signals. Satellites 106 may include satellites in a global navigation satellite system (GNSS) for determining locations of devices (e.g., locations of receivers 102) relative to the surface of the earth (e.g., in coordinates such as latitude and/or longitude). Satellites 106 may include GPS (Global Positioning System) satellites, GLONASS (Globalnaya Navigatsionnaya Sputnikovaya Sistema) satellites, Galileo satellites, BeiDou satellites, or any combination of these satellites or other navigation satellites. In one embodiment, methods and systems disclosed herein may be used to improve the location determined by GNSS. In one embodiment, satellite 106 may include receivers 102.

Aircraft 112 may include any moving platform that carries receiver 102. In one embodiment, aircraft 112 may include an airplane, a helicopter, and/or a drone that moves relative to the earth. In other embodiments, aircraft 112 may be any moving platform such as an automobile or a train.

Server 134 may provide services to receiver 102 and/or process signals recorded by receiver 102 as described herein. In one embodiment server 134 may determine or contribute to the determination of the identity (e.g., classification) of transmitter 108. In another embodiment, server 134 is not present and/or is incorporated into receiver 102 that provides the services of determining or contributing to the determination of the identity of transmitter 108.

Network 180 may allow any device (e.g., receiver 102) in environment 100 to communicate with any other device (e.g., server 134) in environment 100. Network 180 may include one or more packet switched networks, such as an Internet protocol (IP) based network, a local area network (LAN), a wide area network (WAN), an intranet, the Internet, a cellular network, a fiber-optic network, or another type of network that is capable of transporting data. Network 180 may communicate wirelessly with receiver 102 and/or server 134 using any number of protocols, such as GSM (Global System for Mobile Communications), CDMA (Code-Division Multiple Access), LTE (Long-Term Evolution), WiFi (e.g., IEEE 802.11x) or WiMAX (e.g., IEEE 802.16x), etc.

Devices in environment 100 may use network 180 such that, for example, any one device may receive signals and/or messages from any other device. Further devices in environment 100 may be networked together such that, for example, any one device may transmit signals and/or messages to any other device. In one implementation, receiver 102 may receive signals from one or more transmitters 108 without necessarily transmitting signals to any transmitter 108.

Figure 2A:
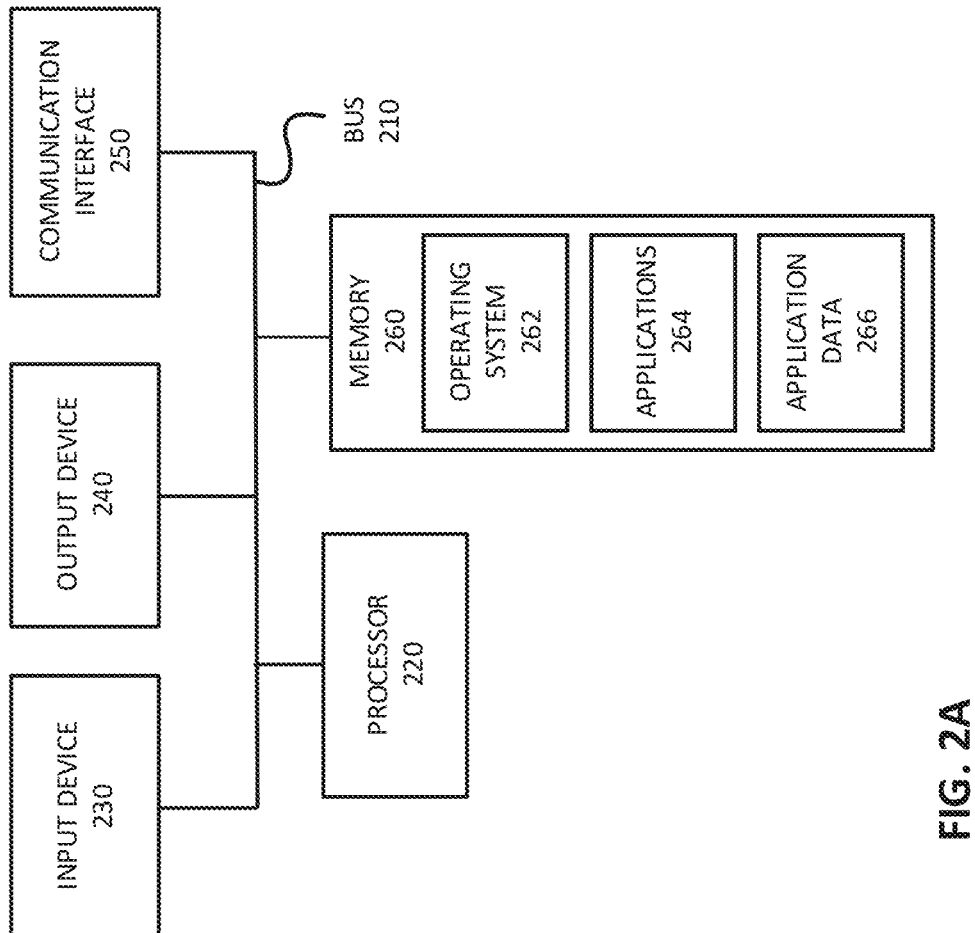
FIG. 2A is a block diagram of exemplary components in a computing module that may perform methods described herein.
Figure 2A:

Devices in environment 100 may each include one or more computing modules. FIG. 2A is a block diagram of exemplary components in a computing module 200. Computing module 200 may include a bus 210, processor 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 includes a path that permits communication among the components of computing module 200. Processor 220 may include any type of processor or microprocessor (or families of processors, microprocessors, or signal processors) that interprets and executes instructions. In other embodiments, processor 220 may include an application-specific integrated circuit (ASIC), a field-programmable gate array (FPGA), etc.

Communication interface 250 may include a transmitter and/or receiver (e.g., a transceiver) that enables computing module 200 to communicate with other devices or systems. Communication interface 250 may include a transmitter that converts baseband signals (e.g., non-modulated signals) to radio frequency (RF) signals or a receiver that converts RF signals to baseband signals. Communication interface 250 may be coupled to one or more antennas for transmitting and receiving electromagnetic (e.g., RF) signals. Communication interface 250 may be coupled to a microphone and/or a speaker for transmitting and receiving acoustic (e.g., sound) signals.

Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth wireless interface, a radiofrequency identification (RFID) interface, a near-field communications (NFC) wireless interface, etc. Communication interface 250 may be adapted to receive signals from transmitter 108, satellite 106 (e.g., GNSS satellites), or other transmitters (e.g., cell towers, radio towers, etc.). Communication interface 250 may allow communication using standards, such as GSM, CDMA, LTE, WiFi, or WiMAX.

Memory 260 may store information describing signals received from communication interface 250. For example, a signal may propagate through space, be received by an antenna (or microphone), be sampled, quantized, and/or stored in memory 260 for analysis by signal processor 272. In addition, memory 260 may store information and instructions (e.g., applications 264 and operating system 262) and data (e.g., application data 266) for use by processor 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include GNU/Linux, Windows, OS X, Android, iOS, an embedded operating system, etc. Applications 264 and application data 266 may provide network services or include applications, depending on the device in which the particular computing module 200 is found.

Input device 230 may allow a user to input information into computing module 200. Input device 230 may include a keyboard, a mouse, a microphone, a camera, a touch-screen display, etc. Some devices may not include input device 230. In other words, some devices (e.g., a "headless" device such as server 134) may be remotely managed through communication interface 250 and may not include a keyboard, for example.

Output device 240 may output information to the user. Output device 240 may include a display, a display panel, light-emitting diodes (LEDs), a printer, a speaker, etc. Headless devices, such as server 134, may be autonomous, may be managed remotely, and may not include output device 240 such as a display, for example.

Input device 230 and output device 240 may allow a user to activate and interact with a particular service or application. Input device 230 and output device 240 may allow a user to receive and view a menu of options and select from the menu options. The menu may allow the user to select various functions or services associated with applications executed by computing module 200.

Computing module 200 may include more or fewer components than shown in FIG. 2A. The functions described as performed by any component may be performed by any other component or multiple components. Further, the functions performed by two or more components may be performed by a single component.

Computing module 200 may perform the operations described herein in response to processor 220 executing software instructions contained in a tangible, non-transient computer-readable medium, such as memory 260. A computer-readable medium may include a physical or logical memory device. The software instructions may be read into memory 260 from another computer-readable medium or from another device via communication interface 250. The software instructions contained in memory 260 may cause processor 220 to perform processes that are described herein.

As described herein, methods and systems described may determine identity information related to emitters 108 (e.g., transmitters 108) in environment 100. In one embodiment, signals may be received and observations recorded. For example, aircraft 112 may carry receiver 102 through environment 100 while receiving signals that are transmitted from transmitters 108. Recording the observations (e.g., samples, sub-samples, and information about the signals) may include recording data into memory 260 information indicative of the power level or other features (e.g., SNR, phase, frequency, polarization, etc.) of the received signal and the corresponding time.

In one embodiment, the location (e.g., determined by location logic 290 or some other method) of receiver 102 may be recorded in memory 260 and associated with the observation. In one embodiment, the time the signals (e.g., determined by a clock or other means) are received and observed may also be recorded in memory 260 and associated with the corresponding signal information. Recorded observations may also be referred to as measurements or measured observations.

Receiver 102 may receive signals and record observations periodically (e.g., based on time such as every fraction of a second, every second, every few seconds, every minute, every few minutes, etc.) or aperiodically (e.g., not evenly spaced in time). Receiver 102 may receive signals and record observations at particular distance intervals (e.g., every few feet, every meter, every kilometer, etc.) or aperiodic distance intervals (e.g., distances not evenly spaced). Receiver 102 may receive signals and record observations when in a particular location. In another embodiment, multiple different receivers 102 may receive signals and record observations. In this embodiment, receivers 102 may be in different locations and the corresponding locations may then be recorded in memory 260 and associated with the recorded observations.

FIG. 2B is a block diagram of exemplary components (e.g., functional components) of receiver 102 and/or server 134 in one embodiment. Receiver 102 and/or server 134 may include a receiver 270, signal processor 272, a bispectral detector 274, bispectral detector 274, training logic 275, learning neural network 276, classification DB 278, identifying logic 279, identifying neural network 280, and/or location logic 290. Receiver 102 and/or server 134 may include additional, fewer, or a different arrangement of components than shown in FIG. 2B. Further, in other embodiments, any component may perform the functions described below of any other component.

Training logic 275 may employ signal processor 272 to sample signals from emitters (e.g., known emitters) for training learning neural network 276 for classifying (e.g., identifying) emitters. Training logic 275 may store identification information in classification DB 278. Identifying logic 279 may employ signal processor 272 to sample signals from emitters (e.g., unknown emitters) for identifying neural network 280 to classify. Identifying logic 279 may then use classification DB 278 to provide the identity of the emitter based on the classification to a desired accuracy. In one embodiment, identifying neural network 280 is the same as learning neural network 276 after having been trained. In another embodiment, identifying neural network 280 and learning neural network 276 are the same neural network and the process of learning and identifying take place at the same time. That is, if an emitter cannot be identified its RF fingerprint is learned for future identification of the same receiver. The components of FIG. 2B are described in more detail below.

Receiver 270 receives signals from emitters and passes the signals to signal processor 272 and/or records the signals (e.g., samples and records). Receiver 270 may be coupled to an antenna (or microphone) and include a demodulator, a sampler, and/or a mixer.

Signal processor 272 may process received signals and/or process observations recorded regarding received signals. For example, signal processor 272 may extract a sample (e.g., a random sample) of a signal for bispectrum analysis by bispectral detector 274. Signal processor 272 may also include a demodulator, a sampler, and/or a mixer.

As described above, bispectral detector 274 may determine the signed amplitude of the bispectrum of a discretely sampled signal. Bispectral detector 274 may reveal the skew of the distribution resulting from non-linear attributes of the signal generating system. In this embodiment, bispectral detector 274 emphasizes the modulation arising from imperfections in the manufactured components that are characteristic of a specific emitter (e.g., unique to that particular emitter). Both training logic 275 and identifying logic 279 may employ bispectral detector 274 while learning to determine emitter identification information (e.g., to generate classification DB 278) or identifying emitters from classification DB 278.

Training logic 275 employs a signal processor 272 (e.g., bispectral detector 274) and learning neural network 276 to learn the effects of artifacts of emitter components on received signals from emitters. Training logic 275 measures the effects of artifacts, trains learning neural network 276, and generates classification DB 278. For example, training logic 275 may sample a received signal from a known emitter and take numerous bispectra samples of the received signal. After feeding the samples into learning neural network 276, an output classification will become associated with the identity of the corresponding emitter. The classification of the emitter and the emitter ID is associated in classification DB 278.

Learning neural network 276 may employ machine learning (ML) as an Artificial Intelligence (AI). Learning neural network 276 may include an artificial neural network, which is a collection of interconnected primitives called neurons that work together to model complex transformations from inputs to outputs. In one embodiment, learning neural network 276 may include a convolutional neural network. In one embodiment, the convolutional neural network may scan an aperture and draw conclusions from basic structures ("primitives") which are detected. The convolutional neural network may be designed for images. In the case of a convolutional neural network designed for images, the neural network may scan a viewing aperture across an image and draw conclusions from basic image structures or image primitives. Subsequent convolutions scan the relative locations of these primitives, and then the relative locations of those aggregates, until an understanding of the entire "image" is attained. Neural networks may be trained by adjusting the internal parameters of each neuron in response to whether the final conclusion of the overall network is correct or incorrect. A neural network is "deep learning" when it has many layers—typically more than five or six—which consecutively process the conclusions of prior layers. A deep learning network may have hundreds of layers.

In one embodiment, learning neural network 276 employs a state-of-the-art deep-learning system (created with computer vision in mind) which has a low computational burden while maintaining sufficient accuracy to assign samples (input) to categories (e.g., emitter identification information) with reasonable certainty. One implementation uses the EfficientNet deep-learning system created by Google Labs.

One version of this system, denoted EfficientNetB0, was sufficient for emitter classification when coupled with a voting scheme as described herein. To construct the EfficientB0 system for emitter classification, the final 1000-category classification layer of a pre-trained Efficient-NetB0 network was replaced with two consecutive 256-node fully connected layers with rectified linear unit (ReLU) activation functions and L2=0.05 regularization, each preceded by a 50% dropout to improve generalizability, and appended a final 352-node softmax classification layer. This neural network is exemplary and different neural networks are possible.

Identifying logic 279 employs a signal processor 272 (e.g., bispectral detector 274) and identifying neural network 280 to employ the lessons learned to samples of received signals from emitters (e.g., unknown emitters). Identifying logic 279 measures the effects of artifacts, employs identifying neural network 280, and generates a classification based on classification DB 278. For example, identifying logic 279 may sample a received signal from an unknown emitter and take numerous bispectra samples of the received signal. After feeding the samples into identifying neural network 280, an output classification will become associated with the identity of the corresponding emitter. The classification of the emitter and the emitter ID is associated in classification DB 278.

Identifying logic 279 may extract samples (e.g., random samples) from a signal, compute the bispectrum of each sample, and deploy a trained deep learning system to create a vote for the classification (e.g., the emitter identity) for each sample. Using the statistical techniques described herein, identifying logic 279 may continue to extract samples, classify samples, vote, and accumulate votes until an emitter identity is determined to a desired (e.g., prescribed, predetermined, and/or any arbitrary) degree of accuracy. With this method, an emitter may be correctly identified with a desired certainty based on a preponderance of a large population of samples. Each vote (or count) for a classification corresponds to a bispectrum of a sample taken from the emitter whose identity is being determined. Identifying logic 279 may evaluate each bispectrum by an algorithm (e.g., a convolution neural network) trained specifically to identify emitters based on a preponderance of bispectra appearing to be characteristic of that emitter and not of other emitters. When the bispectra of all possible samples from an emitter are considered, having a preponderance identified with that emitter is how certainty of identification is defined, because the classifier has been trained and tested to uniquely identify each of the finite set of emitters on that basis. The classification of the emitter and the emitter ID is associated in classification DB 278.

Measurement error may be modeled as Gaussian, and the mean of a large number of measurements is likely to be closer to the truth than any one particular measurement. In a binary classification situation, the measurement is a classification decision of one particular emitter (e.g., the bispectrum of a sampled signal from that emitter) into one of two categories, and if the classification decision is modeled as random, with the probability of classification of that one particular object into the first of the two categories provided by a corresponding fixed probability number p, then the distribution of n classification decisions, each made by one member of the crowd of n evaluators, follows a binomial distribution, where k is the number of votes for the first class whose probability was p.

$$f_{binomial}(k, n, p) = \frac{n!}{k!(n-k)!} \cdot p^k (1-p)^{n-k}$$

As the number of bispectra increases, it becomes increasingly certain that the category containing the largest number of individual classification votes will be that category whose probability is the higher. If there is a large set of votes, but it is not known what the underlying probability is, then the probability itself is an unknown (e.g., random) entity, and its distribution is known as a Beta distribution. The density f of probability p for the first category, after $(\alpha-1)$ votes for the first category and $(\beta-1)$ votes for the second category, is as follows. (The use of $(\alpha-1)$ and $(\beta-1)$ is by convention, and the exclamation point represents the factorial operation.)

$$f_{beta}(p; \alpha, \beta) = \frac{(\alpha + \beta - 1)!}{(\alpha - 1)! \cdot (\beta - 1)!} \cdot p^{(\alpha-1)}(1-p)^{(\beta-1)}$$

This is a distribution for the probability of the first category. Conceptually, the probability of the first category is a fixed quantity, but it is not known, so it is modeled with what is known. The benefit of thinking of the probability of the first category as following a distribution, rather than tabulating the largest number of votes and assessing a "winner," is that the Beta distribution also informs of how certain the identity of the winner is, which allows the counting of votes to continue until the certainty reaches some threshold (e.g., a predetermined threshold). This helps determine how certain the identity of the "winning" category is. For example, assume that identifying logic 279 desires to achieve a 99% certainty that the winner of the voting scheme is indeed the most probable category. If a single vote is observed, a winner can be declared but the certainty that the winning category had indeed been the most probable is not necessarily determined. However, according to the Beta distribution, if identifying logic 279 has 60 votes for the first category and 40 votes for the second category, then $\alpha=61$ and $\beta=41$, giving $$f_{beta}(p; 61, 41) = \frac{(61 + 41 - 1)!}{(61 - 1)! \cdot (41 - 1)!} \cdot p^{(61-1)}(1-p)^{(41-1)}$$

Figure 4:
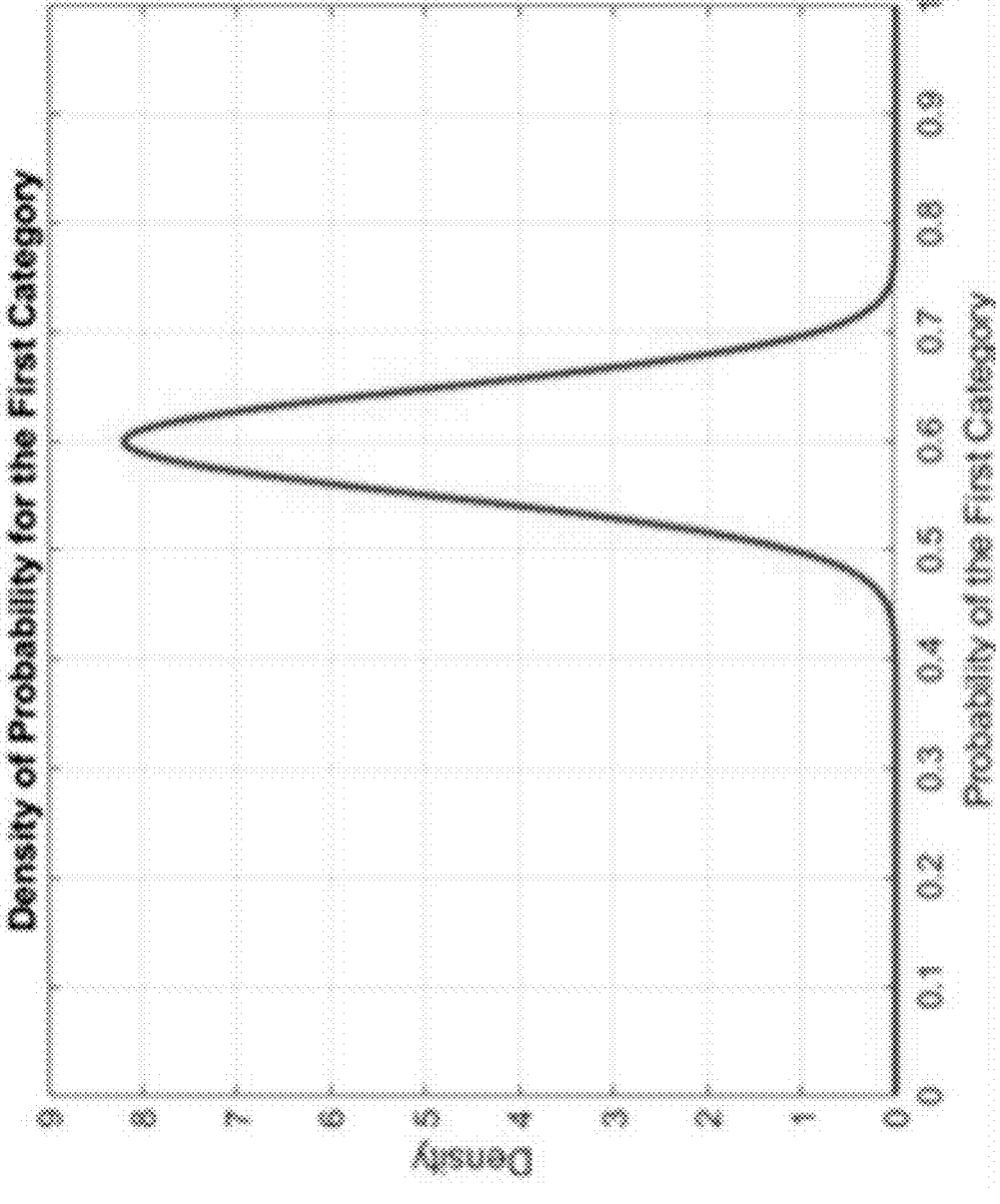
FIG. 4 is a probability density function for one category of a two category classification system.

This probability density function is shown as a plot in FIG. 4 for density f as a function of probability p. With 100 votes tallied, for example, how certain is it that the first category is the true winner among a large population, and not just the winner of a 100 vote by random chance in the selection of samples? In other words, what is the chance that the first category has a true probability of less than 50%? The cumulative Beta distribution F(p; α,β) is:

$$F_{beta}(p; \alpha, \beta) = \frac{(\alpha + \beta - 1)!}{(\alpha - 1)! \cdot (\beta - 1)!} \cdot \int_0^{p} x^{(\alpha-1)}(1-x)^{(\beta-1)} dx$$

In the current example, F(p; α,β)=F(0.5; 61,41)=2.3%, yielding a 97.7% certainty that the first category is truly the most favored. An insight at this point is that it is possible to keep tabulating more votes until the sample indicates the true winner with a desired degree of certainty. In this example, if the number of tabulated votes is quadrupled to 400 and the same 60%/40% split in votes is observed, the certainty would be 99.997% that the first category would truly be more likely, because F(0.5; 241,161)=0.00003067.

The use of the cumulative Beta distribution on each category individually is a conservative approach because it works even if the probability of the most probable category only minimally exceeds 50% for the most favored category, and the second most probable category consumes all of the remaining probability. In practice, for example, the most probable category may attains, on average, a probability exceeding 80% (often significantly higher), and the second most probable category attains, on average, a probability for each single voter that does not exceed 16% (often significantly lower), because the probability for an incorrect category is divided among the several incorrect categories. As a result, when a maximum acceptable error rate (such as 5%) is chosen, in practice a realized error rate that is much smaller (such as $10^{-5}$) is observed. This benefit is not relied upon, however. Identifying logic 279 may use the conservative individual cumulative Beta function alone to ensure that the error rate is below the specified threshold.

As in this case, if the measurement in question is a classification decision of one particular object into one of several (N) categories, and if the classification decision is modeled as random, with the probability of classification of that one particular object into each category provided by a corresponding entry in a fixed vector of probability values, then the distribution of classification decisions made with multiple votes follows a multinomial distribution. Here, the vector p contains an entry $p_i$ for each category i in the set of categories $\{1, \ldots, N\}$, and the number in that entry is the probability of that category being selected. The vector k also contains an entry $k_i$ for each category i, and the number in that entry is the number of classification decisions that were made into that category out of n total decisions by the sample of voters. The multinomial distribution f(k, n, p) is then $$f_{multinomial}(k, n, p) = \frac{n!}{\prod_{i=1}^{N} k_i!} \cdot \prod_{i=1}^{N} p_i^{k_i}$$

where for the N classes, the N probabilities sum to unity, and the N numbers of classification selections ki sums to the n total selections:

$$\sum_{i=1}^{N} p_i = 1, \sum_{i=1}^{N} k_i = n$$

As before, when the number of voters (n) rises, it becomes more likely that the largest number of choices among the entries in $k=(k_i)$ will be for the category with the largest probability entry in p=(pi). If as before, identifying logic 279 knows the number of votes for each category as $k=(k_i)$, but identifying logic 279 do not know the set of category probabilities $p=(p_i)$, then identifying logic 279 may compute the distribution of those unknown probabilities by employing the Dirichlet distribution, which is the multinomial analogue of the Beta distribution. Here f(p,α) is the density of a probability vector p=(pi) given a vector of parameters α=(αi) where by convention, αi=ki+1.

$$f_{dirichlet}(p; \alpha) = \frac{\left(\left(\sum_{i=1}^{N} \alpha_i\right) - 1\right)!}{\prod_{i=1}^{n} (\alpha_i - 1)!} \cdot \prod_{i=1}^{N} p_i^{\alpha_i - 1}$$

Identifying logic 279 may proceed by computing the distribution of the probability vectors p=(p_i), which is a multivariate distribution, and determine for each category i the fraction of densities where the probability p, exceeds the probabilities of each of the other categories individually, thus establishing the most likely "true" category for the object being classified. Previously in the two-class case, identifying logic 279 declared a category to be most likely true if its probability exceeded that of the other category. Here, identifying logic 279 may declare a category to be "true" if its probability exceeds that of all other categories combined. If a category has a majority vote of the entire population—that is, probability of greater than 50% (with enough votes counted to overcome the predetermined level of required certainty)—then it is selected the winner.

This may be referred to as "a population preponderance," which allows identifying logic 279 to use what is called the marginal distribution of the density for each category, where the marginal distribution for a particular category is the distribution of that category summed over all possible values that may be assigned to any other category. The marginal distribution of the Dirichlet distribution is the familiar Beta distribution. While it may seem intuitive to use the Beta distribution immediately to classify an object into one of more than two categories, a rigorous examination requires a formal statement that the Beta distribution is the marginal distribution of the Dirichlet distribution. This is proven by repeatedly leveraging what is known as the aggregation property of the Dirichlet distribution, which states that when any two categories in the distribution are combined into a single category, the resulting distribution is also Dirichlet, where the probability parameter αi for the new combined category is simply the sum of the parameters for the replaced categories. This is repeated until only two categories remain, whereupon the result is identical to the Beta distribution.

For determination of identity information via voting, identifying logic 279 accumulates votes until the cumulative Beta distribution for some category indicates that the category has a probability greater than 50% (a population preponderance) with a prescribed level of confidence. The ability to do this is predicated upon the ability of identifying logic 279 and/or identifying neural network 280 to correctly identify samples from a particular radio at some fraction of the time that is greater than 50%. If the classifier cannot label the each category correctly more than 50% of the time, then a formulation of the classifier system in which the correct radio is identified at least more often than any other radio (though perhaps not 50% of the time) can be constructed, simply by ensuring that the Beta distributions are compared among all alternative radios individually, where the probabilities of error are then added (a conservative approach since errors can be concurrent rather than independent). While successful, this "population favored" method (meaning most common, even if not greater than 50% of the whole) was not necessary for the present effort, because the classifier was able to obtain greater than 50% accuracy for all radio subsamples. The "population favored" method was, however, tested, and gave results in all cases identical to the population preponderance method, the test results for which are described below.

In one embodiment, location logic 290 may include GNSS logic to determine the location of transmitter 108 and/or receiver 102 relative to the surface of the earth (e.g., latitude and/or longitude) and/or location information of receiver 102 relative to satellites 106. Location logic 290 may then use methods and systems disclosed herein to improve the location determined by GNSS logic or use the location to determine the location of transmitter 108 relative to the surface of the earth. GNSS logic may interpret signals received from satellites 108 to derive location information. GNSS logic may include logic that interprets signals from GPS (Global Positioning System) satellites, GLONASS (Globalnaya Navigatsionnaya Sputnikovaya Sistema) satellites, Galileo satellites, BeiDou satellites, or any combination of these satellites or other navigation satellites.

As described herein, methods and systems may use RF fingerprinting to determine emitter identification information, e.g., within a specified accuracy. As described above, training logic 275 may receive signals from known emitters, such as satellite 106, phone 108, tower 108, and/or satellite dish 118. Training logic 275 trains learning neural network 276 (e.g., one emitter at a time as described above) such that each emitter is associated with a different classification (e.g., an output of learning neural network 276). This association, once learned to a desired accuracy level (e.g., 80%), may be stored in classification DB 278. When training is complete for the emitters, learning neural network 276 may be copied to identifying neural network 280 for identifying emitters when a signal is received and an association to the corresponding emitter is not known.

Figure 3:
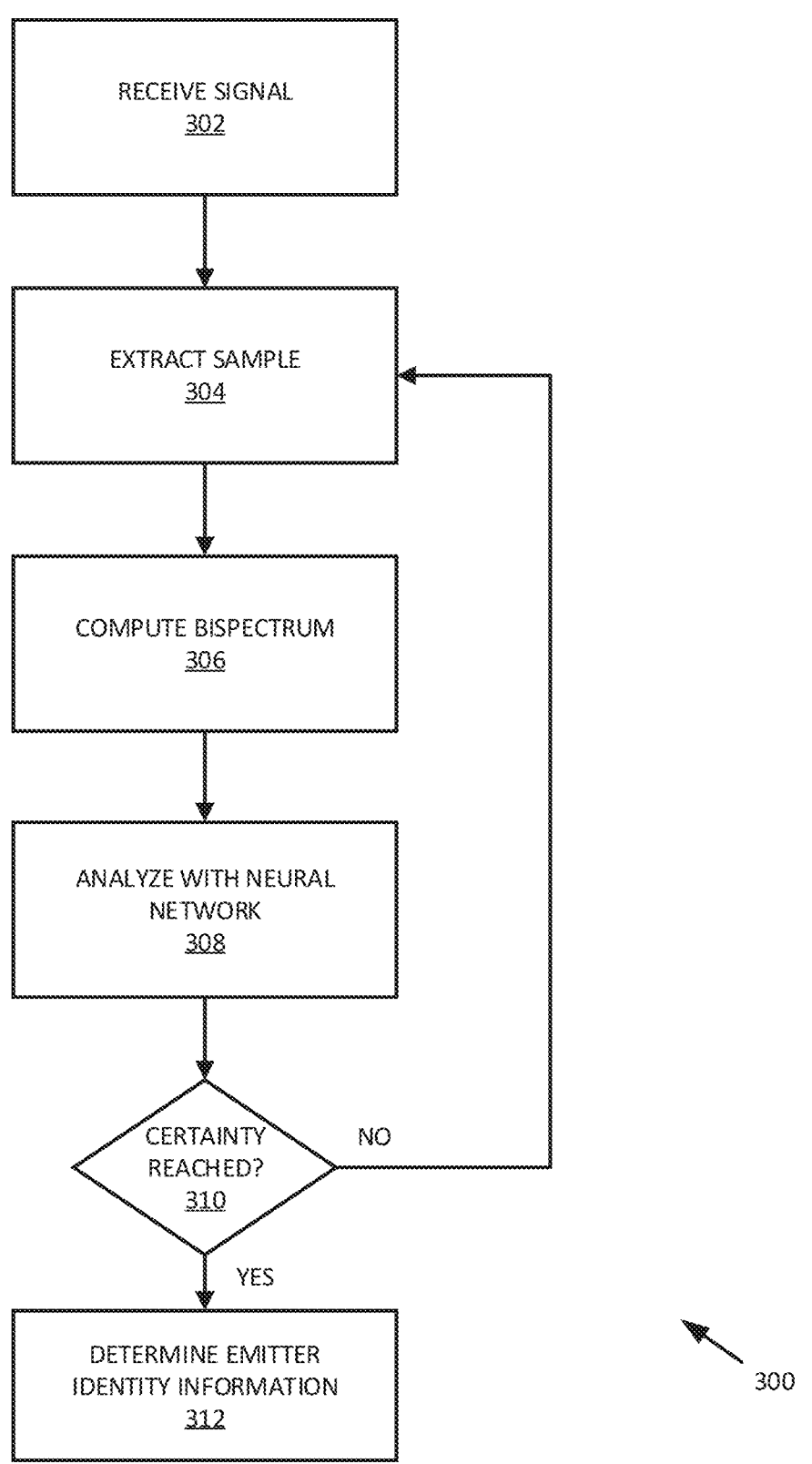
FIG. 3 is a flowchart of a process for determining emitter identification information to a desired accuracy.

FIG. 3 is a flowchart of a process 300 for determining emitter identification information using an identifying neural network (or a "trained neural network") using RF fingerprinting according to one or more embodiments disclosed herein. Process 300 may be executed by identifying logic 279 running in server 134 and/or other devices.

Process 300 begins with emitter 108 transmitting a signal wherein the signal includes effects caused by imperfections, as described above. Process 300 continues with receiving the signal (block 302). Receiver 270 receives the signal and signal processor 272 may extract the information signal (e.g., by removing the carrier frequency, demodulating the received signal, and/or demodulating the received signal such that the carrier frequency is zero). Signal processor 272 may extract a sample and/or sub-sample of (block 304) as described above.

The bispectrum is computed (block 306). For example, as described above, bispectral detector 274 may compute and/or determine bispectrum information (block 306). The bispectrum is provided to identifying neural network 280 (block 308). In one embodiment, identifying logic 279 provides the bispectrum to identifying neural network 280 (block 308) for analysis. Identifying neural network 280 determines a category based on the sample and/or sub-sample. This determination may be considered a "vote" for the classification determined by identifying neural network 280.

If the desired certainty has not been reached (block 310: NO), then another sample may be extracted to improve the certainty (block 304). If the desired certainty has been reached (block 310: YES), then process 300 may determine the emitter identification information from classification DB 278 (block 312).

Although the methods and systems described above may apply to modulated signals, in other embodiments, analyzed signals may be non-modulated signals and/or naturally occurring signals. For example, a signal may include a heartbeat signal of a human or animal as an electrocardiogram (ECG) signal. In this case, ECGs with known conditions (e.g., a healthy, fast, slow, or abnormal heart rhythm, a heart defect, coronary artery disease, heart valve disease, an enlarged heart, a previous heart attack, or a high risk of a heart attack) may be used by training logic 275 to train learning neural network 276. An unknown ECG may be then fed into identifying neural network 280 to diagnose a condition of the unknown ECG. In yet other embodiments, the emitted signals may be other than electromagnetic signals or RF signals (e.g., such as sound signals). As the term is used herein, a sub-sample is a sample or a sample of a sample.

Because these artifacts or warblings may result from imperfections in the manufacturing process, in some instances these warblings are unintentional, although the methods described herein are not limited to unintentional effects. As used herein, the term "population preponderance" means the demanded statistical tests, which could be 50% plus a delta or another statistical test for a value less than 50% or more than 50%. In other words, samples may be taken until the prescribed level of certainty is obtained as calculated by the statistical test(s). For example, if identifying logic 279 gets significantly more than a preponderance from the start, not as many samples may be needed to get to a desired level of certainty.

As disclosed herein, in one embodiment, the one-dimensional technical problem of specific emitter identification may be converted into a two-dimensional problem (e.g., a two-dimensional image problem) using the bispectrum of the baseband signal, thus enabling computer vision techniques to be applied.

As disclosed herein, in one embodiment, the technical problem of reaching a level of certainty may be achieved with the Beta and Dirichlet distributions, thus enabling any desired level of accuracy to be achieved by examining sufficient samples and/or subsamples of a signal containing a fingerprint (e.g., an RF fingerprint).

As disclosed herein, in one embodiment, a linear increase in the number of evaluated subsamples may yield a logarithmic reduction in error. That is, each inclusion of approximately 4 additional subsamples may yield an order of magnitude reduction in error.

Testing on a published set of data (e.g., published emitter signal data) yields significantly better performance than what was achieved in DARPA research and appears to create a new state of the art. The technique described above is applied to specific emitter identification on a published dataset of physically recorded over-the-air signals from 16 ostensibly identical high-performance radios. The technique uses a multi-channel deep learning convolutional neural network acting on the bispectra of I/Q signal subsamples each consisting of 56 parts per million (ppm) of the original signal duration. High levels of accuracy are obtained with minimal computation time: in this application, each addition of eight samples decreases error by one order of magnitude.

The published data set of over-the-air signals was from 16 ostensibly identical USRP X310 software-defined radios which transmitted identical information using the same IEEE 802.11a modulation scheme. These radios are described by the manufacturer Ettus Research as "high performance" and have a retail price of about $7,000 each. The data set was recorded by the Genesys research lab at Northeastern Ucarrierarch funded by the Defense Advanced Research Projects Agency (DARPA) under its Radio Frequency Machine Learning Systems program, the Genesys research lab analyzed providers of the data set and created a deep-learning system to identify specific radios with an error rate of 1.4% without interacting with the radios themselves. They also obtained improved error rates of 0.5% and 0.24% when interacting with the radios and when introducing additional hardware impairments to them.

As described above, in one embodiment a state-of-the-art deep-learning computer vision system, which has a low computational burden, may maintain sufficient accuracy to assign samples to emitter identity with reasonable certainty. The EfficientNet deep-learning system created by Google Labs may be employed (e.g., classification DB 278 and/or identifying neural network 280). In one embodiment, the simplest version of this system, denoted EfficientNetB0, was sufficient for purpose when coupled with a voting scheme as described above. To construct the EfficientB0 system, the final 1000-category classification layer of a pre-trained Efficient-NetB0 network with two consecutive 256-node fully connected layers with rectified linear unit (ReLU) activation functions and L2=0.05 regularization, each preceded by a 50% dropout to improve generalizability, and appended a final 352-node softmax classification layer. In this case, a 352-node layer was used because 352 [which equals (16 radios) times (11 distances between radio and receiver) times (2 runs per setup)] was the number of test cases in the published radio signal dataset. EfficientNetB0 expects input dimensions of 224×224 for each input image, so that became the dimensions of the bispectral input; however, a bispectrum of a signal sample having only 224 sample points was not intuitively expected to have sufficient length to demonstrate an adequate duration of modulation caused by artifact, so the system selected sample lengths of 1120 points, constructed the 1120×1120 bispectra, and downsampled to 224×224 bispectra using the summed power (amplitude squared) density within each 5×5 cell as the value for that cell. The system rescaled the bispectra power quantities to integer values from 0 to 255, and then converted the resulting 2-D intensity plot to a 3-color plot by biasing the red, green, and blue color channels to high, medium, and low power levels respectively (using the Matlab "jet" colormap for reproducibility), thus constructing a 224×224×3 full color bispectrum image for each evaluated sample. While the details of these hyperparameters were chosen intuitively, and could have been chosen differently, subsequent testing revealed that adjusting them would not have significantly improved the results because arbitrary accuracy had already been obtained with minimal computational effort. The conversion from simple intensity (grayscale) to full color did, however, improve the subsequent results appreciably, since the system could effectively leverage the three color channels of the EfficientNetB0 convolutional neural network.

To create a bispectra data set, 200 samples were extracted from each of the two the recorded signals of 11 different SNR levels for each of the 16 radios, for a total of 704,000 samples, and the process was repeated independently for validation and test data sets of 70,400 samples each. The samples constituted approximately 1.1 percent of the available data for each signal. EfficientNetB0 was trained (e.g., training logic 275) using a categorical cross entropy optimizer for approximately 200 epochs until the overall validation accuracy reached approximately 82%. Higher accuracy was not necessary because the voting scheme described above does not require it. Higher accuracies may be obtained with longer samples, larger bispectrum images, and so forth, but a lower accuracy was used for computational efficiency. That is, high accuracy may be created subsequently via the voting scheme described above).

The EfficientNetB0 deep learning network has 16,126,480 trainable parameters at single precision (32 bits per quantity) summing to about 62 megabytes, yet the RF signal data set consists of about 104 gigabytes of data, or over 1,700 times the size of learnable parameters in the network. It is unlikely, therefore, that the network is tabulating ("memorizing") the signal data in order to classify emitters. At the level of bispectra, the training data set consisted of 704,000×224×224 numbers prior to channelization, equating to about 35 billion numbers, or about 2,190 times the number of the trainable parameters in EfficientB0, leading to an analogous conclusion that the neural net could not have "memorized" the training data.

To identify a specific emitter, methods and systems described above may extract a random sample of its signal, compute the bispectrum, submit the bispectrum to the deep-learning system (e.g., having been trained) for classification, and continue the process of extracting samples and classifying them until the cumulative Beta distribution function for any category indicated a population preponderance with a probability in excess of the preset accuracy requirement.

Figure 5:
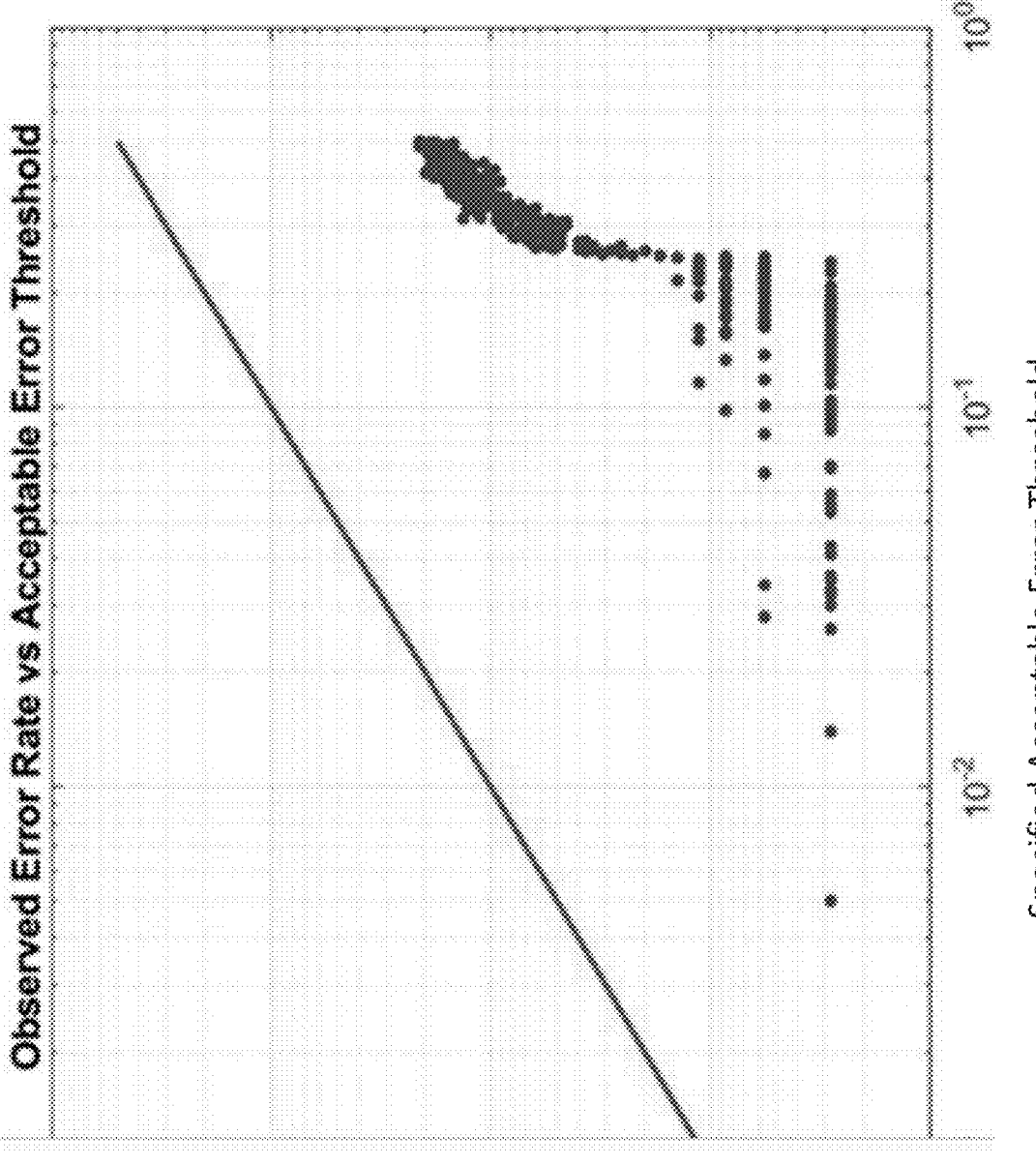
FIG. 5 shows an observed error rate versus acceptable error threshold in one embodiment.

To assess accuracy, the system was run 19 times over each of the 352 test cases at 500 different acceptable error thresholds ranging from 0.001 to 0.5, and the observed error rates for classification shown in the chart in FIG. 5 were obtained for the 1.76 million total cases. The line represented equality between the observed error rate and the specified acceptable error. Threshold on this log-log plot is shown in red. observed error rates do not appear on this plot for most specified acceptable error thresholds below 0.01 because in simulations, the observed error rates were zero, which is off the bottom of the chart.

In typical cases, the observed error rate is one or more orders of magnitude more favorable than the acceptable error threshold. This is because the model continues to draw samples until its certainty meets or exceeds acceptability, but since the sampling process is inherently a discrete process, the certainty that is achieved will generally be more favorable than the acceptable limit, simply because it results from a discrete improvement at each step (e.g., in ascending through the integers until achieving an integer that is greater than $p_i$, one must attain at least 4, significantly exceeding the threshold of p, simply because one must take a discrete step from 3 to 4 in order to meet the goal of being greater than or equal to the threshold of $p_i$.)

Figure 6:
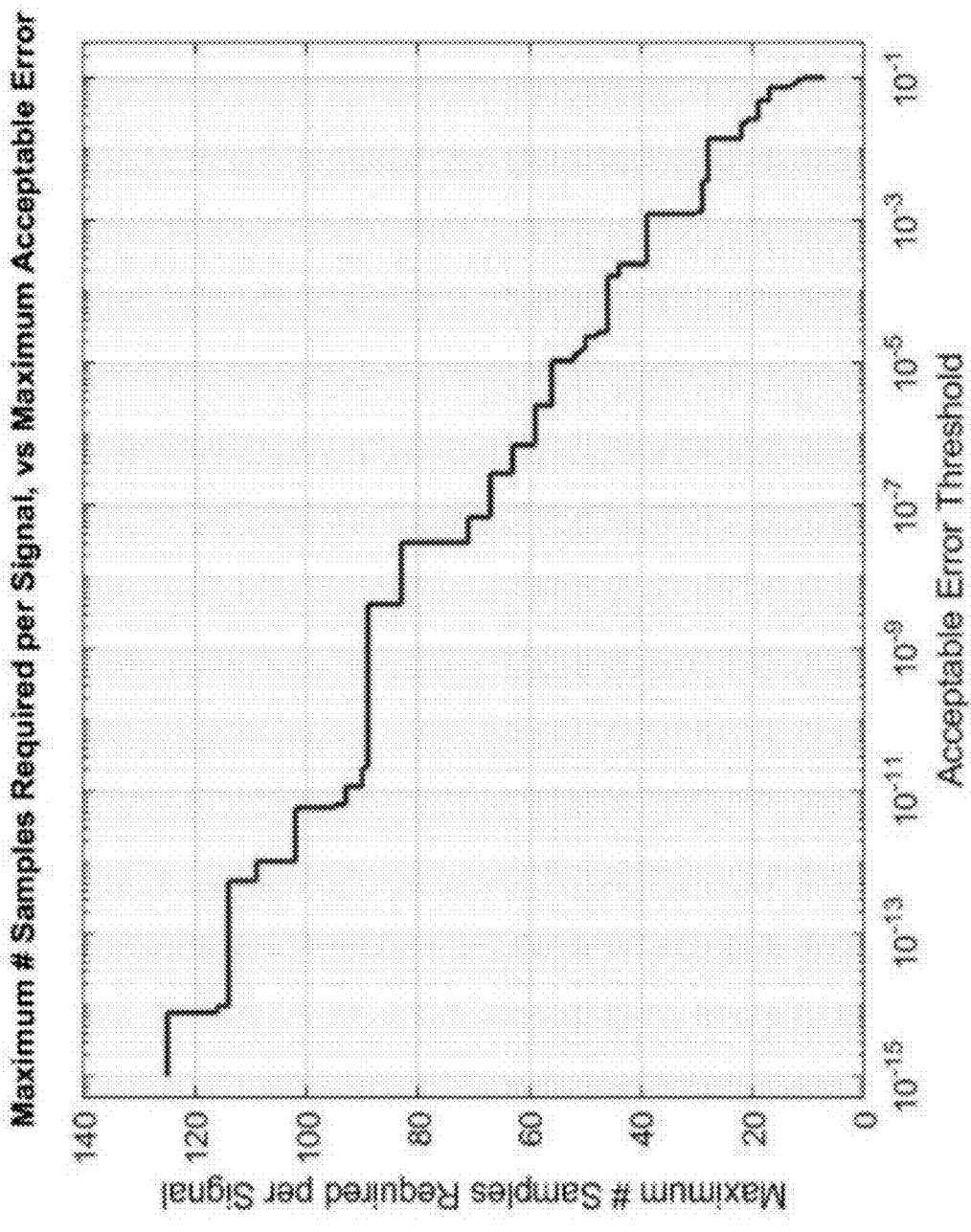
FIG. 6 shows a maximum number of samples that may be required per signal versus the maximum acceptable error in one embodiment.

A variety of acceptable error thresholds were selected from $10^{-1}$ through $10^{-15}$ (the latter being a classification error rate of one part in one quadrillion) into 5000 logarithmically distributed values (to create a uniform distribution on a semilog plot), and for each acceptable error threshold, the radio identities were computed to the prescribed level of accuracy for each of the 16 radios, 11 distances from the receiver, and 2 duplicate runs, for a total of 352 cases per acceptable error threshold. In all of these simulation runs (352*5000) there were no instances where the system failed to identify the correct radio, even though the samples drawn to make identifications were selected randomly from the test dataset (for each case). For each value of the threshold, the largest number of samples that were required to reach the requisite level of certainty were determined, across all radios at all distances from the receiver and at both of the two repeated runs the prescribed accuracy rates. The maximum number of samples that needed to be drawn, as compared to the requisite acceptable error thresholds, are shown in FIG. 6.

A linear least-squares best fit to the maximum number of samples required (NSAMP), as a function of the logarithm of the Acceptable Error Threshold (EAT), yields:

$$N_{SAMP} = -7.77 \cdot E_{AT} + 12.98$$

with a regression coefficient of causation R2=0.982. From this it is shown that a linear increase in the number of samples taken from a signal yields a logarithmic reduction in the error identifying the signal. In the above described method and system, every additional eight samples taken from a signal yields a greater than 10 fold reduction in error identifying that signal. This indicates that not only are very high levels of accuracy attainable, but they can be obtained by minimal increases in computational effort. Also, because each signal sample lasts for only 56 parts per million (ppm) of the entire signal duration, in the aggregate only a very small portion of each signal is actually needed to obtain the desired arbitrary level of accuracy. For example, as shown, in order to obtain an error rate of one in a trillion, it may only be necessary to obtain about 110 samples in the worst case, or just over one half of one percent (0.0062) of the signal duration.

As described herein, methods and systems enable accurate classification using a system of voting on samples with its attendant statistical interpretation. The system is applied to specific emitter identification on a published dataset of physically recorded over-the-air signals from 16 ostensibly identical high-performance radios. For each signal sample consisting of about 56 parts per million of the original signal duration, a two-dimensional full color bispectrum was computed from the one-dimensional I/Q data. A three-channel computer vision deep learning convolutional neural network was trained upon the images that resulted from 704,000 samples. A testing set of 70,400 unrelated samples were created and voting was performed on the test samples until a threshold level of accuracy was obtained in emitter identifications. Methods and systems described above may minimize computation time because evaluation on the order of about 20 to 50 testing subsamples provided the desired near-zero error levels. Previous efforts on the published dataset resulted in error rates of approximately 1.4%, whereas this effort has resulted in an error rate arbitrarily close to zero, which appears to constitute a new state of the art.

The foregoing description of implementations provides illustration and description, but is not intended to be exhaustive or to limit the invention to the precise form disclosed. Modifications and variations are possible in light of the above teachings or may be acquired from practice of the invention. For example, while a series of messages and/or blocks have been described with regard to FIG. 4, the order of the blocks and message/operation flows may be modified in other embodiments. Further, non-dependent blocks may be performed in parallel. Sampling as used herein may be described as sampling the emitted signal, sampling the demodulated signal, and/or sampling the bispectra of a signal.

In one embodiment, methods and systems described herein may authenticate emitters, e.g., use identification as a form of authentication. For example, GPS satellites 106 may have known RF fingerprints (e.g., as stored in classification DB 278 after training by training logic 275). If identifying logic 279 does not authenticate a a signal (e.g., identify the emitter within a desired threshold), then location logic 290 the signal may be ignored as a likely spoofed signal.

In one embodiment, systems and methods described herein may be used for human gait identification, where an individual's walk identifies the individual even in disguise. As noted above, methods and systems described herein may be used for heartbeat identification to identify disease or an individual. In some embodiments, the signal may be sound or even ultrasound. In one embodiment, systems and methods disclosed herein may be used for the sound of blood flowing turbulently through a carotid artery to detect atherosclerosis. In one embodiment, methods and systems described herein may be used to determine industrial equipment problems and/or automotive problems. In one embodiment, abnormal behavior in a system may be based on the rejection of the classification of "normal behavior" to a desired classification level (e.g., rather than training the neural network on abnormal behavior).

As noted above, the final 1000-category classification layer of EfficientNetB0 was deleted and replaced with two consecutive 256-node fully connected layers with rectified linear unit activation functions and L2=0.05 regularization, each preceded by a 50% dropout to improve generalizability, and a final 352-node softmax classification layer was appended. As discussed 352 [(16 radios)*(11 distances between radio and receiver)*(2 runs per setup)] was the number of test cases in the published radio signal dataset. A number of runs other than "2" is possible. A number of nodes other than 256 is possible. Further, any regularization technique may be used, for example L1 and/or L2 with any regularization parameter value. The dropout may be any fraction other than, for example, 50%. A number of nodes other than 352 may be used, such as any integer number of nodes corresponding to the number of desired categories. Further any final node type is possible other than softmax.

In one or more embodiments, methods and systems described herein enable computer vision to be applied to images of the bispectra, which may provide for efficiency and accuracy. Methods described herein may convert a 1-D signal problem into a 2-D computer vision problem. Methods and systems also enable the engagement of all 3 color channels for the computer vision by using the three colors to emphasize different aspects of the power intensities. Each color channel may be used to emphasize either low, mid, or high power of the frequency correlations, by applying a function that maps the power intensities (of the bispectra) differently into the brightnesses on each color channel. These functions may be any function, and may be learned by the system or chosen some other way. That the functions are different (instead of a grayscale intensity plot) adds information to the learning process. For example, having low power in one location and high power in another location at the same time can be just as informative as having high power in both places. Embodiments disclosed use EfficienNet computer vision systems but any other computer vision system could be used instead.

In one embodiment, a receiver can be aware of its own fingerprint (e.g., RF fingerprint) and subtract it from the observed fingerprint of a received signal (e.g., the received power bispectra) in order to learn RF fingerprints of an emitter or use a library of RF fingerprints recorded by a different receiver. In one embodiment, the system described herein can establish a receiver bispectrum by receiving signals from known emitters with known bispectra, or at silence, or at well-characterized noise-like signals.

In one embodiment, if the threshold accuracy is not reached within a given number of samples or votes, then the emitter may be determined to be unknown and the signal samples may then be used to train the neural network to classify the emitter and associated with emitter identification information (such as the location of the signal, the time the signal was received, etc.). This information may be stored in classification DB 278 and associated with the classification of the emitter.

Information stored in classification DB 278 may include the location the emitter was first seen, a universally unique identifier (UUID) assigned to the emitter when first observed, the type of emitter, signal strength, the associated classification, etc.

Certain features described above may be implemented as "logic," a "unit," or a "component" that performs one or more functions. This logic, unit, or component may include hardware, such as one or more processors, microprocessors, application specific integrated circuits, or field programmable gate arrays, software, or a combination of hardware and software.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

Various embodiments have been described herein with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:

receiving a signal in a receiver from a transmitter wherein the signal propagates from the transmitter to the receiver;

demodulating the received signal to generate a demodulated signal having a carrier frequency of zero;

determining a bispectrum associated with the demodulated signal;

classifying the bispectrum into a classification using a neural network having been trained to a signal emitted by the transmitter; and determining an accuracy of the classification based on a probability of the classification being greater than a threshold.

2. The method of claim 1, further comprising:

repeating determining the bispectrum, classifying the bispectrum, and determining the accuracy of the classification of the bispectrum until the probability of the classification is greater than the threshold.

3. The method of claim 2, wherein the transmitter is a first transmitter, the method further comprising:

training the neural network based on signals emitted by the first transmitter and a plurality of other transmitters.

4. The method of claim 1, wherein the neural network is a convolutional neural network for computer vision.

5. The method of claim 1, wherein the probability of the classification being greater than a threshold is based on a Dirichlet or Beta distribution.

\* \* \* \* \*